United States Patent
Panesar

(10) Patent No.: US 6,793,949 B2
(45) Date of Patent: Sep. 21, 2004

(54) SOLUBLE PARTICLES WITH ENCAPSULATED AROMA AND METHOD OF PREPARATION THEREOF

(75) Inventor: Satwinder Singh Panesar, Banbury (GB)

(73) Assignee: Kraft Foods Holdings, Inc., Northfield, IL (US)

(*) Notice: Subject to any disclaimer, the term of this patent is extended or adjusted under 35 U.S.C. 154(b) by 390 days.

(21) Appl. No.: 09/978,181

(22) Filed: Oct. 17, 2001

(65) Prior Publication Data
US 2003/0091696 A1 May 15, 2003

(51) Int. Cl.[7] .......................... A23F 5/00; A23L 1/221
(52) U.S. Cl. .................... 426/93; 426/98; 426/307; 426/594; 426/650; 426/651
(58) Field of Search .................... 426/93, 98, 307, 426/651, 594, 650

(56) References Cited

U.S. PATENT DOCUMENTS

| | | |
|---|---|---|
| 3,823,242 A | 7/1974 | Paton et al. |
| 4,520,033 A | 5/1985 | Tuot |
| 4,610,890 A | 9/1986 | Miller et al. |
| 4,707,367 A | 11/1987 | Miller et al. |
| 5,030,473 A | 7/1991 | Ghodsizadeh |
| 5,079,026 A | 1/1992 | Arora et al. |
| 5,222,364 A | 6/1993 | Carns et al. |
| 5,399,368 A | 3/1995 | Garwood et al. |
| 5,496,574 A | 3/1996 | Rushmore et al. |
| 5,882,717 A * | 3/1999 | Panesar et al. .............. 426/595 |
| 6,174,557 B1 * | 1/2001 | Gamez-Rumpf et al. .... 426/594 |
| 6,544,576 B2 * | 4/2003 | Zeller et al. ................ 426/594 |

FOREIGN PATENT DOCUMENTS

| | | |
|---|---|---|
| EP | 0 008 015 | 2/1980 |
| WO | WO 96/23423 | 8/1996 |

* cited by examiner

Primary Examiner—Anthony Weier
(74) Attorney, Agent, or Firm—Stites & Harbison PLLC; Marvin Petry

(57) ABSTRACT

The present invention describes aromatized particles containing aromatized vegetable oil contained within a shell of a water soluble encapsulant such that upon dissolution with hot water a burst of aroma will be released. The process to produce the aromatized particles is also set forth.

10 Claims, 2 Drawing Sheets

SOLUBLE PARTICLES WITH ENCAPSULATED AROMA AND METHOD OF PREPARATION THEREOF

BACKGROUND OF THE INVENTION

The present invention relates to soluble, or instant, coffee. The manufacture of instant coffee involves extracting roasted and ground coffee beans with water under conditions of high temperature and pressure to form extracts which are dried, such as by spray drying, freeze drying or the like. The manufacture of instant coffee causes the loss of a large part of the aroma constituents and of the volatile components of the coffee. As a result, when a cup of instant coffee is prepared, for example by dissolving a portion of instant coffee in a cup of hot water, the beverage is essentially aromaless when compared to a cup of brewed roast and ground coffee. When roast and ground coffee is brewed, a unique aroma is experienced, often perceivable throughout a large room. It is generally recognized in the coffee industry that consumers associate coffee quality with a good coffee aroma. Therefore, a number of attempts have been made to trap coffee aroma lost during coffee processing and to add the trapped aroma to instant coffee to enhance its aroma.

A large number of techniques have been developed to trap coffee aroma, usually in coffee oil or in coffee extract. See, for example, U.S. Pat. Nos. 3,823,242, 5,030,473 and 5,222,364. Aromatized coffee oil is then sprayed onto instant coffee powder or incorporated in it. However, most of the aroma escapes into the container and the aroma is essentially completely lost after three or four openings of the container. Moreover, very little aroma is perceived at the time that a beverage is prepared. Many attempts have been made to address these problems. Such attempts have included attempts to encapsulate aroma in such a way that the aroma is released only when a beverage is prepared by dissolving soluble coffee in hot water. Such aroma release is referred to as "above cup aroma" or simply "cup aroma".

It is desirable to encapsulate aromas and flavors in such a way that they are preserved from degradation due to moisture, oxygen, heat or external/internal molecular product, interactions, and to prevent their volatilization since most aroma compounds are of high volatility. Spray drying which produces an easily handled powdered product is one of the most common aroma encapsulation methods at present. However, a major problem occurring when an aqueous coffee extract is spray dried is the loss of many desirable volatile materials or "top notes", or a change in composition of the heat-or oxygen-sensitive aromas. These changes and losses can change the overall aroma characteristics and in turn, make them undesirable.

Solutions of matrix materials containing either dissolved or dispersed flavors and aromas can be freeze dried to encapsulate volatile components. However, freeze drying, which leads to a porous and foamy structure of the finished product, also has problems in capturing and encapsulating volatile components.

Other methods of encapsulation include spraying a coffee aroma-containing emulsion as fine droplets onto soluble beverage powder which coats the droplets. When dried, the coffee forms a shell which encapsulates the aroma. Methods of this type are described in European Patent Application 0008015A1 and in published International Application No. WO 96/23423. Although the capsules are satisfactory, large aroma loss occurs during the encapsulation process. Capsule wall formation is not instantaneous and a large amount of aroma is lost during drying of the wall. After drying, the capsules form good walls to retain the aroma and flavor, and the capsules dissolve readily when hot water is added to release the encapsulants. Also the process does not involve heating or vacuum drying steps so there is no loss or change of the volatile components. The capsules when added to a soluble beverage powder, e.g., soluble coffee, enhance or provide additional aroma or flavor upon dissolution of the soluble beverage in hot water. However, the aroma has very small impact, as most of aroma has been lost. The impact of aroma can be increased by increasing the number of capsules, but a large quantity of aroma carrying oil would then be retained on the cup surface. The presence of oil slick has an adverse affect on consumer preference. In addition, aroma is not stoichio-metrically added. The quantity of aroma generated during instant coffee processing is not sufficient enough to provide acceptable in-cup aroma for instant coffee preparation.

Melt encapsulation of aroma or flavor is a known technique in which a carbohydrate melt is prepared and the aroma and/or flavor to be encapsulated added. The solution is then quenched at elevated temperatures using, for example, isopropyl alcohol, producing a solid carbohydrate product containing flavor. Such techniques are disclosed in U.S. Pat. No. 4,610,890 and U.S. Pat. No. 4,707,367. As opposed to a batch type of melt encapsulation just described, in more recent years there has been developed a continuous extrusion melt encapsulation process. In a continuous process described in U.S. Pat. No. 5,079,026, the aroma or flavor is dispersed in an extruded matrix of coffee glass. The coffee extract with a high percentage of soluble solids is heated to form a viscous melt at temperatures typically above 60° C., above the glassy transition phase, but below 130° C. to prevent degradation of the extract. The encapsulants are then dispersed within the hot viscous melt. The hot viscous melt containing the encapsulants is gasified and then extruded through a restricted orifice into a sheet or rod of coffee glass. After cooling, the sheet or rod is then broken up to the desired size. Considerable thermal degradation of the encapsulants take place in this process, altering their profile when they are added to the hot viscous melt. When a beverage is prepared, a large proportion of the aroma dissolves in the hot water rather than being released above the cup. Moreover, unless the sheet or rod is broken up into very small particles there will not be a "burst" of aroma because of the slow rate of dissolution of the coffee glass. It is suggested that gasification of the melt will improve the product's solubility. However, the procedure has been mainly unsuccessful in releasing a sufficient "burst" of aroma for the consumer to be able to detect an above cup aroma.

U.S. Pat. No. 5,399,368 describes a method of encapsulation using a co-extrusion technique. An inert gas, e.g., $CO_2$, is dissolved under pressure in an aromatized edible liquid such as aromatized coffee oil and a melt for forming a rigid outer shell of the capsules is formed from an edible carbohydrate material such as soluble coffee. The edible liquid is then co-extruded within the viscous melt to continuously form an extrudate having an outer shell of edible carbohydrate material surrounding an inner core of the edible liquid. The extrudate is extruded into a pressure zone which has a pressure higher than that of the internal pressure of the inert gas dissolved in the edible liquid. At this point the extrudate is subdivided transversely into sealed capsules of a predetermined length and the capsules are left in the high pressure zone until the melt has formed a hard carbohydrate glass surrounding the aromatized liquid. When placed in hot liquid, the capsule dissolves, releasing the aroma compounds. However, the glass wall dissolves less readily compared to porous spray dried or freeze-dried coffee powder. The delayed dissolution of the glassy wall inhibits an instant burst of aroma. The presence of gas increases the release rate of aroma once the glassy wall is dissolved. When coffee extract is employed, the solids concentration is high (e.g., 92% in Example 1, of U.S. Pat. No. 5,399,368) and co-extrusion is carried out at very high pressures e.g., 200 bar for the coffee melt and 5 bar for the gasified aroma. The outer wall of the capsule is difficult to control due to the large pressure differential. In addition, a rotating knife is used to cut the rod being co-extruded in order to form capsules. It is very unlikely that the outer co-extruded wall is going to seal itself after the rod is cut at both ends. The drying process for the capsules takes a few hours. As a consequence, capsules will tend to stick together during the early period in the drying chamber.

It is an object of the invention to provide capsules which encapsulate aromatized vegetable oil within a shell and which, upon dissolution in hot water, will release a burst of aroma. It is a further object of the invention to provide such capsules which are prepared from 100% coffee-derived material or other carbohydrate materials. It is a further object of the invention to provide such capsules having a shell which has substantially closed cell porosity which reduces the density of the capsules and which facilitates their dissolution without rapid loss of aroma that would occur with open cell porosity It is a further object of the invention to provide a simple method of preparation of such capsules.

Disclosure of the Invention

The foregoing and other objects which will be apparent to those of ordinary skill in the art are achieved in accordance with the invention by providing individual particles comprising aromatized vegetable oil encapsulated in a solid shell of a porous water soluble encapsulant, the porosity of said shell being substantially closed cell porosity, open cell porosity of said shell being not more than 25% based on the total porosity of said shell. A method of making volatile aroma containing capsules is also disclosed which comprises providing gasified aromatized vegetable oil, providing an aqueous solution containing 50 to 75% by weight of a water soluble encapsulant based on the weight of the extract, forcing the gasified aromatized vegetable oil through a first spray nozzle aperture and simultaneously forcing the aqueous solution of the water soluble encapsulant through an annular spray nozzle aperture which surrounds said first spray nozzle to co-extrude droplets of gasified aromatized vegetable oil surrounded by said encapsulant, and contacting said droplets with a liquid desiccant to dehydrate said droplets to form particles having a solidified shell of a porous encapsulant surrounding aromatized vegetable oil, the porosity of said solidified shell being substantially closed cell porosity, open cell porosity of said shell being not more than 25% of the total porosity of said shell.

The water soluble encapsulants may include, but are not limited to instant or soluble coffee solids, instant tea solids, cyclodextrin, maltodextrin, gelatin, pectin, guar gum, and gum arabic. Preferably the water soluble encapsulant is instant coffee solids. The aromatized vegetable oil may contain flavorants and/or aromatics derived from fruit, meat, seafood, spices, vegetables, etc.; preferably the aromatics are obtained from coffee, tea and chocolate and most preferably the aromatics are obtained from the coffee manufacturing process such as steam aroma, grinder gas, percolator vent gas, etc. The vegetable oils can include, but are not limited to coffee oil, safflower oil, palm oil, peanut oil, soybean oil, corn oil, etc. Preferably the vegetable oil is coffee oil. In the preferred embodiment, the aromatized capsules are prepared from 100% coffee-derived materials, i.e. the encapsulant is coffee solids and the aromatized vegetable oil is coffee oil containing coffee aroma. Throughout the remainder of the specification, with the exception of Examples 4 to 9, for purposes of convenience, the water soluble encapsulant shall comprise instant or soluble coffee solids and the aromatized vegetable oil shall comprise aromatized coffee oil. However this is not intended to limit the scope of the invention thereto.

DESCRIPTION OF PREFERRED EMBODIMENTS

Figure 1:
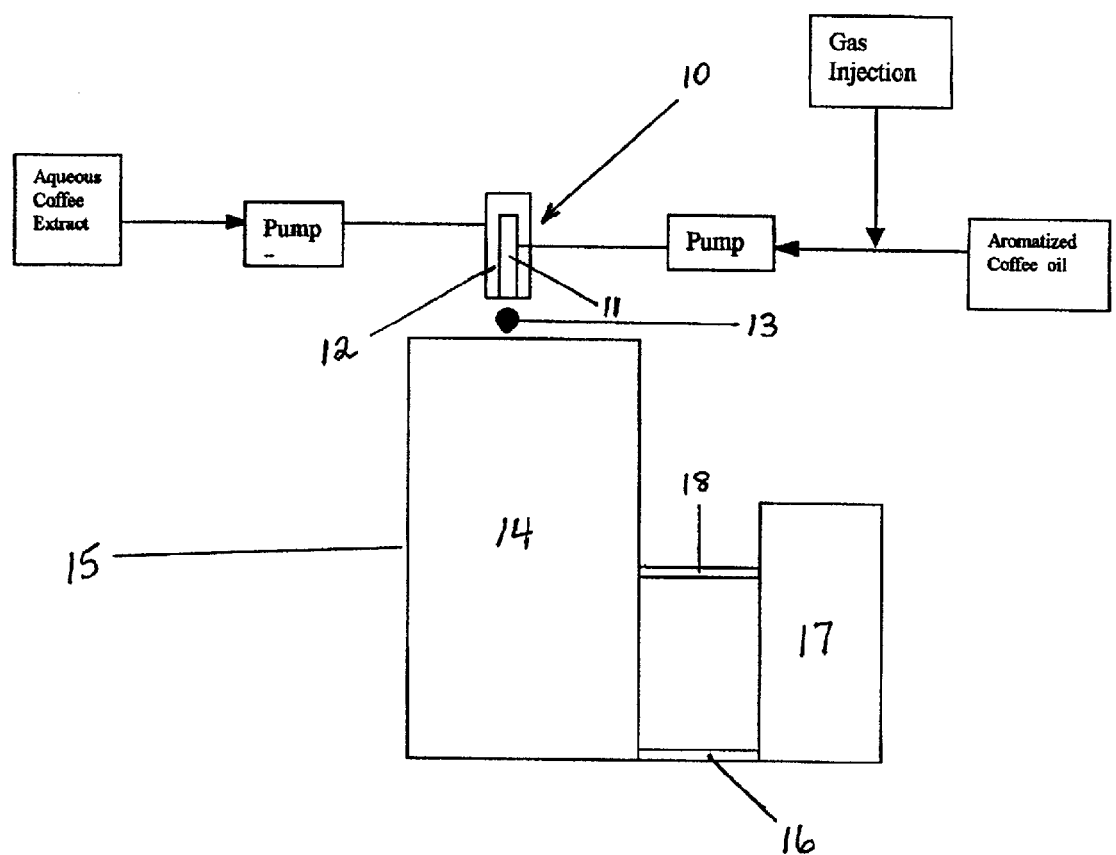
FIG. 1 is a diagrammatic illustration of equipment suitable for preparing capsules in accordance with the invention.

With reference to the drawings, an aromatized coffee oil is gasified by injection of an inert gas to cause foaming and the resulting foamed aromatized coffee oil is pumped through the central aperture 11 of a co-extrusion nozzle 10. At the same time, an aqueous coffee extract is pumped through an annular aperture 12 which surrounds central aperture 11. Flow rates and pressures in the nozzle are controlled to form droplets 13, each droplet having a core of gasified aromatized coffee oil surrounded by a substantially spherical wall of the aqueous coffee extract. The droplets fall into a body 14 of a liquid desiccant, such as anhydrous alcohol, in container 15. The anhydrous alcohol dehydrates the shells of the droplets, causing the shells to harden. The dehydrated droplets are removed from the tank and the alcohol removed, preferably by gently heating the dehydrated droplets at temperatures not exceeding about 50° C. The water content of the main body of alcohol 14 is preferably maintained at a low level by continuously removing and dehydrating a stream of alcohol 16 taken from tank 15 and then recycling the dehydrated alcohol to tank 15. Dehydration of the alcohol is preferably achieved by passing the stream of alcohol 16 through a bed 17 of drying agent, such as calcium sulphate crystals. The dehydrated alcohol is then recycled via conduit 18 to tank 15. The water content of the main body 14 of alcohol is preferably not more than 5%, and more preferably not more than 4% by weight. The process may be made essentially continuous by employing a plurality of alcohol tanks and causing the droplets to fall into one tank while removing dehydrated droplets from another.

Co-extrusion nozzle 10 is preferably constructed of stainless steel. The gasified aromatized coffee oil enters a first port 19 of the nozzle and is forced through inner chamber 20 to central outlet aperture 11. The aqueous coffee extract enters a second port 21 of the nozzle and is forced through peripheral chamber 22 to annular outlet aperture 12 which surrounds aperture 11. Central aperture 11 is preferably circular Annular aperture 12 preferably closely surrounds central aperture 11 such that its inner diameter only slightly exceeds the diameter of central aperture 11. This is preferably accomplished by tapering to a point the cylindrical outer end 23 of wall 24 surrounding inner chamber 20.

Figure 2:
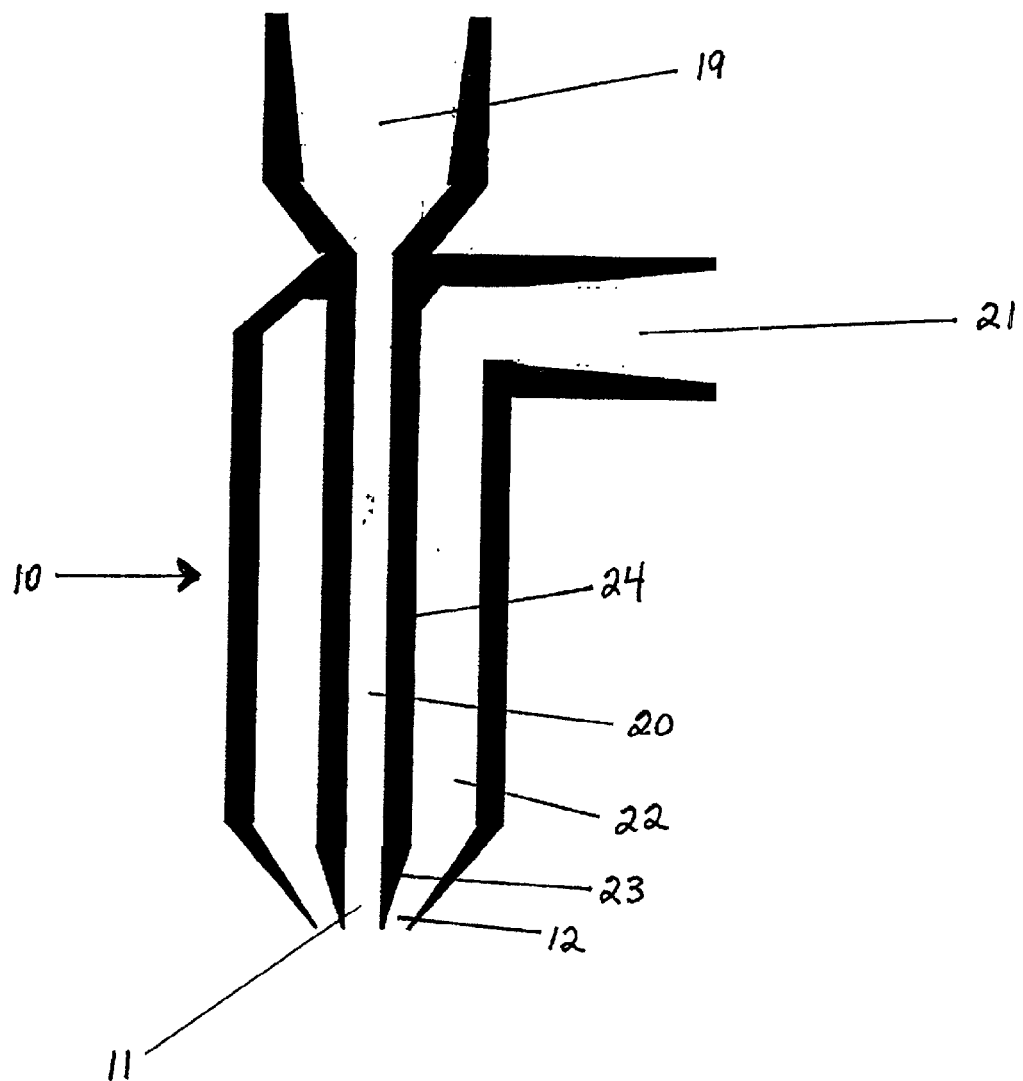
FIG. 2 is a diagrammatic illustration of a co-extrusion nozzle employed in the equipment depicted in FIG. 1.

It is an advantage of the invention that the aqueous coffee extract is not required to be of high viscosity as to require pumping the extract through the nozzle at high pressures. It is preferred that the solids content of the aqueous extract is not more than 75% by weight, more preferably not more than 70% by weight, and most preferably not more than 65% by weight based on the weight of the extract. If the solids concentration is too low, however, the integrity of the extracted droplets will be impaired. A minimum coffee solids content of the extract is about 50% by weight and more preferably 55% by weight, and most preferably about 60% by weight The aqueous coffee extract can be obtained in any conventional way such as by aqueous extraction of roast and ground coffee or by dissolving instant coffee in water. It is an advantage of the invention that the capsules can be made entirely of coffee-derived materials and it is therefore preferred that the solids content of the extract is 100% coffee-derived. It is also preferred that the aqueous liquid employed to prepare the extract is water The flow rate and pressure of the gasified aromatized coffee oil and of the aqueous coffee extract in the co-extrusion nozzle are controlled to form droplets having a shell of the coffee extract encapsulating a core of encapsulated oil. Suitable flow rates and pressure will, of course, depend on the design of the co-extrusion nozzle including the size and configuration of the nozzle outlet orifices. It is preferred, however, that the size of the dried capsule products is about 0.5 to 5 mm in diameter. Accordingly, for a nozzle configuration such as shown in FIG. 2, an outer diameter of annular aperture 12 of about 0.5 to 5 mm is suitable. In examples below, a co-extrusion nozzle is employed which has a central circular aperture of 1 mm and an annular aperture which surrounds the central aperture and has an inside diameter of substantially 1 mm and an outer diameter of 2 mm. For this nozzle, a flow rate of from 1 to 100 ml/minute at a pressure of up to 30 or 40 psi is suitable for both the coffee extract and the gasified oil. Variable speed pumps are preferably employed to force the extract and gasified oil components through the co-extrusion nozzle. Controlling the pump speed will control the flow rate and pressure, and pump speeds can be easily set to cause the formation of the droplets.

Gasification of the aromatized oil is preferably conducted with $CO_2$ or with any other inert gas such as nitrogen which does not adversely affect coffee aroma. Gas injection is preferably accomplished with a sparger and at a gas pressure which causes the oil to foam. A gas pressure in the range of 10–50 psi is suitable.

Anhydrous alcohol is preferred as the liquid desiccant in tank 15, and it is preferred to position tank 15 such that the droplets do not impact the upper surface of the liquid at a velocity that would cause significant distortion.

It is preferred that the aromatized coffee oil both before and after being gasified, is maintained at a temperature of from 0 to 50° C., and more preferably not more than 25° C. It is preferred to maintain the coffee extract at a temperature of from 0 to 70° C., and preferably not more than 40° C.

The liquid desiccant is preferably maintained at a temperature of from 10 to 80° C., and more preferably from 35 to 50° C.

The amount of the aromatized oil fed to the co-extrusion nozzle is preferably from 20 to 80%, and more preferably from 40 to 60% by weight, based on the weight of the combination of aqueous extract and oil fed to the nozzle.

The product particles are substantially spherical and preferably have a particle size (diameter) of from 0.5 to 5 mm. Wall thickness of the product particles is preferably from about 20 to 80% of the particle diameter. The content of aromatized oil is the product particles is preferably from 20 to 80%, and more preferably from 40 to 60% by weight, based on the weight of the product particles. Moisture content of the product particles is generally from 0.5 to 5% by weight, and preferably from 2 to 4% by weight, based on the weight of the particles. The entire content of the particles is preferably 100% coffee derived.

Scanning election microscope (SEM) examination of sections of the encapsulated product particles shows that the solid wall is porous and that the porosity is substantially all of the closed cell type, with very little channeling and open pore porosity that would permit rapid loss of encapsulated aroma, Examination of SEM of product particles encapsulated with coffee extracts having a solids content of from 50 to 75% in accordance with the invention shows that the total pore volume of the open cell porosity or channeling in the walls of the product particles does not exceed about 25% of the total pore volume.

Product particle density is preferably about 0.1 to 0.8 g/cc and more preferably about 0.2 to 0.4 g/cc. It is a distinct advantage of the invention that the relatively low density of the product particles will cause the particles to float and remain on or near the surface of hot water. The porous nature of the shell of the capsule facilitates its dissolution at a rate comparable to that of spray dried coffee, and the aroma will tend to be released at or near the surface of the hot water which will minimize the loss of aroma due to dissolution in the water and maximize a burst of cup aroma.

The coffee oil and coffee aroma employed in the invention can be any coffee oil or aroma derived from coffee such as those described in the U.S. patents identified above, the disclosures of each of which are herein incorporated by reference. It is preferred to employ from 0.01 to 20% by weight and more preferably from 0.2 to 2% by weight coffee aroma, based on the weight of the aromatized coffee oil.

The aromatized product capsules are preferably utilized in instant coffee products, such as spray dried or freeze dried instant coffee products, preferably in an amount of from 0.01 to 20%, and more preferably 0.1 to 1% by weight, based on the weight of the instant coffee to which the capsules are added. The capsules are preferably homogeneously blended with the instant coffee and it is an advantage of the invention that the process can be easily controlled to produce capsules having a density which closely matches a target density of an instant coffee product to which the capsules are intended to be added. In order to minimize particle segregation, it is preferable that the capsule density is not more than 10–350% different than that of the particulate instant coffee product with which the capsules are blended, which is primarily determined by the level of substitution.

The invention is further illustrated in the examples which follow.

Preparation of Particles

EXAMPLE 1

Dehydrated aromatized coffee oil containing 20% by weight of coffee aroma obtained from cryogenically condensed aroma frost is gasified by injecting carbon dioxide at a pressure of 20 psi. The gasified aromatized coffee oil is pumped through the central 1 mm aperture of a stainless steel co-extrusion nozzle. An aqueous coffee extract having a soluble coffee solids content of 65% by weight is simultaneously pumped through an annular aperture which surrounds the central aperture. The annular aperture has an inside diameter slightly greater than 1 mm, an outside diameter of 2 mm, and an annular width of ½ mm. The extract is pumped at a flow rate of 20 ml/minute and at a pressure of 30 psi. The gasified aromatized coffee oil is pumped at a flow rate of 20 ml/minute and at a pressure of 30 psi. The co-extruded material forms droplets of gasified aromatized coffee oil encapsulated in the aqueous coffee extract. The droplets fall into a tank containing anhydrous alcohol having a water content of not more than 3% by weight. A stream of alcohol is continuously pumped from the tank through a calcium sulphate drying tower to remove water, and the dehydrated alcohol is recycled to the tank. The liquid coffee extract droplets become dehydrated in the anhydrous alcohol, causing the formation of soluble coffee particles having a solidified shell of soluble coffee encapsulating the aromatized coffee oil. The dried particles are separated from the alcohol and gently heated at 20–50° C. to completely remove alcohol form the particles. Scanning electron microscope examination of sections of the particles shows that the solidified shell has many fine closed cell pores. The amount of open porosity in the shell is estimated to be about <25% based on the total shell porosity. The size of the particles is 1–3 mm. Density of the particles is 0.15–0.3 g/cc.

EXAMPLES 2–3

Example 1 is followed, except that the solids concentration of the aqueous extract, and the pumping pressure and flow rates are as shown in Table I.

TABLE I

| EXAMPLE | EXTRACT | | | GASIFIED COFFEE OIL | |
|---|---|---|---|---|---|
| | SOLIDS CONC. (wt. %) | PUMPING PRESSURE (psig) | FLOW RATE (ml/min) | PUMPING PRESSURE (psig) | FLOW RATE (ml/mm) |
| 2 | 60 | 30 | 20 | 40 | 80 |
| 3 | 70 | 40 | 40 | 30 | 10 |

Particle size, density and porosity results are as reported in Table II.

TABLE II

| EXAMPLE | PARTICLE SIZE (mm) | DENSITY (g/cc) | OPEN CELL POROSITY (% of Total Porosity) |
|---|---|---|---|
| 2 | 1–2 | 0.25–0.25 | <10 |
| 3 | 1–4 | 0.15–0.25 | <25 |

Aroma Evaluation

The aroma produced on dissolving the capsule particles of Examples 1–3 is evaluated by blending the particles with a fresh portion of Maxwell House® Coffee, a commercially available spray dried instant coffee. The blend contains 1% by weight of the capsule particles based on the weight of the blend. A coffee beverage is prepared by spooning 1 grams of the blend into a coffee cup containing 100 ml. of water at 80° C. Comparison beverages are prepared in the same manner, employing the same amount of the commercial instant coffee employed to make the blends. A sensory panel of twenty persons is employed to evaluate the perception of aroma. The sensory panel evaluates the perception of aroma burst on preparation of the coffee beverage and the perception of aroma over the cup after the beverage is prepared. Results are as shown in Table III.

TABLE III

| | PERCEPTION OF AROMA | |
|---|---|---|
| BEVERAGE | AT TIME OF BEVERAGE PREPARATION | OVER-THE-CUP |
| Commercial Soluble Coffee | None | Very Little |
| With Capsules of Example 1 | Significant | Some |
| With Capsules of Example 2 | Very Significant | Fairly significant |
| With Capsules of Example 3 | Some | Some |

GC count was total count analyzed over 2 minutes of preparation time. The cup after preparation was placed under closed container from which released aroma+air were pumped to GC for analysis. From table IV it is clearly evident that capsules loaded with higher aroma dosage show higher GC count and higher aroma is perceived.

TABLE IV

| | AT TIME OF BEVERAGE PREPARATION | |
|---|---|---|
| BEVERAGE | Sensory - Perception | Chemistry - GC count |
| Commercial Soluble Coffee | None | 235,350 |
| With Capsules of Example 1 | Significant | 2,539,430 |
| With Capsules of Example 2 | Very Significant | 8,467,830 |
| With Capsules of Example 3 | Some | 700,450 |

EXAMPLE 4–7

Type of aroma carrier oil and water soluble encapsulant material can be changed utilizing exactly the same conditions. Table V lists different materials used. Aqueous solution of 65% concentration of the various water soluble encapsulant materials are co-extruded with aroma fixed with different carrier oil as core material.

TABLE V

| EXAMPLE | AROMA | OIL | SHELL MATERIAL |
|---|---|---|---|
| 4 | Coffee | Palm oil | Coffee |
| 5 | Coffee | Coffee oil | Gelatin |
| 6 | Coffee | Coffee oil | Cyclodextrin |
| 7 | Coffee | Coffee oil | Maltodextrin |
| 8 | Artificial coffee aroma (supplied by Givaudan*) code: 10283-73 | Coffee oil | Coffee |
| 9 | Mint (supplied by Givaudan*) code: 10732-76 | Palm oil | Gelatin |

*Givaudan UK Ltd, Chippenham Drive, Kingston, Milton Keynes, MK10 0AE, UK

EXAMPLE 4

Dehydrated aromatized palm oil containing 20% by weight of coffee aroma obtained from cryogenically condensed aroma frost is gasified by injecting carbon dioxide at a pressure of 20 psi. The gasified aromatized palm oil is pumped through the central 1 mm aperture of a stainless steel co-extrusion nozzle. An extract of coffee having solids content of 65% by weight is simultaneously pumped through an annular aperture which surrounds the central aperture. The coffee extract and gasified aromatized palm oil are pumped at a flow rate of 20 ml/minute and at a pressure of 30 psi. The co-extruded material forms droplets of gasified aromatized palm oil encapsulated in the coffee extract which are dried in anhydrous alcohol having a water content of not more than 3% by weight. The dried particles are separated from the alcohol and gently heated at 20–50° C. to completely remove alcohol form the particles. The amount of open porosity in the shell is estimated to be about <25% based on the total shell porosity. The size of the particles is 1–3 mm. Density of the particles is 0.15–0.3 g/cc.

EXAMPLE 5

Dehydrated aromatized coffee oil containing 20% by weight of coffee aroma obtained from cryogenically condensed aroma frost is gasified by injecting carbon dioxide at a pressure of 20 psi. The gasified aromatized coffee oil is pumped through the central 1 mm aperture of a stainless steel co-extrusion nozzle. An aqueous solution of Cyclodextrin 65% concentration is simultaneously pumped through an annular aperture which surrounds the central aperture. The aqueous Cyclodextrin solution and gasified aromatized coffee oil are pumped at a flow rate of 20 ml/minute and at a pressure of 30 psi. The co-extruded material forms droplets of gasified aromatized coffee oil or aromatized oil encapsulated in the aqueous Cyclodextrin which are dried in anhydrous alcohol having a water content of not more than 3% by weight. The dried particles are separated from the alcohol and gently heated at 20–50° C. to completely remove alcohol from the particles. The amount of open porosity in the shell is estimated to be about <25% based on the total shell porosity. The size of the particles is 1–3 mm. Density of the particles is 0.15–0.3 g/cc.

EXAMPLE 6

Dehydrated aromatized coffee oil containing 20% by weight of coffee aroma obtained from cryogenically condensed aroma frost is formed by injecting carbon dioxide at a pressure of 20 psi. The gasified aromatized coffee oil is pumped through the central 1 mm aperture of a stainless steel co-extrusion nozzle. An aqueous solution of gelatin having 65% concentration is simultaneously pumped through an annular aperture which surrounds the central aperture. The aqueous solution and gasified aromatized coffee oil are s pumped at a flow rate of 20 ml/minute and at a pressure of 30 psi. The co-extruded material forms droplets of gasified aromatized coffee oil or aromatized oil encapsulated in the aqueous gelatin which are dried in anhydrous alcohol having a water content of not more than 3% by weight. The dried particles are separated from the alcohol and gently heated at 20–50° C. to completely remove alcohol form the particles. The amount of open porosity in the shell is estimated to be about <25% based on the total shell porosity. The size of the particles is 1–3 mm. Density of the particles is 0.15–0.3 g/cc.

EXAMPLE 7

Dehydrated aromatized coffee oil containing 20% by weight of coffee aroma obtained from cryogenically condensed aroma frost is gasified by injecting carbon dioxide at a pressure of 20 psi. The gasified aromatized coffee oil is pumped through the central 1 mm aperture of a stainless steel co-extrusion nozzle. An aqueous solution of Maltodextrin having 65% concentration is simultaneously pumped through an annular aperture which surrounds the central aperture. The aqueous solution and gasified aromatized coffee oil are s pumped at a flow rate of 20 ml/minute and at a pressure of 30 psi. The co-extruded material forms droplets of gasified aromatized coffee oil or aromatized oil encapsulated in the aqueous maltodextrin which are dried in anhydrous alcohol having a water content of not more than 3% by weight. The dried particles are separated from the alcohol and gently heated at 20–50° C. to completely remove alcohol from the particles. The amount of open porosity in the shell is estimated to be about <25% based on the total shell porosity. The size of the particles is 1–3 mm. Density of the particles is 0.15–0.3 g/cc.

EXAMPLE 8

Dehydrated coffee oil is aromatized with artificial coffee flavour supplied by Givaudan (code: 10283-73) by adding 20% flavour by weight and the combination is gasified by injecting carbon dioxide at a pressure of 20 psi. The gasified aromatized coffee oil is pumped through the central 1 mm aperture of a stainless steel co-extrusion nozzle. An extract of coffee having solids content of 65% by weight is simultaneously pumped through an annular aperture which surrounds the central aperture. The coffee extract and gasified aromatized oil are pumped at a flow rate of 20 ml/minute and at a pressure of 30 psi. The co-extruded material forms droplets of gasified aromatized coffee oil encapsulated in the coffee extract which are dried in anhydrous alcohol having a water content of not more than 3% by weight. The dried particles are separated from the alcohol and gently heated at 20–50° C. to completely remove alcohol form the particles. The amount of open porosity in the shell is estimated to be about <25% based on the total shell porosity. The size of the particles is 1–3 mm. Density of the particles is 0.15–0.3 g/cc.

EXAMPLE 9

Mint flavour supplied by Givaudan (code: 10732-76) is added to palm oil at 25% by weight which is gasified by injecting carbon dioxide at a pressure of 20 psi. The gasified aromatized palm oil is pumped through the central 1 mm aperture of a stainless steel co-extrusion nozzle. An aqueous solution of gelatin having 65% concentration is simultaneously pumped through an annular aperture which surrounds the central aperture. The aqueous solution and gasified aromatized palm oil are pumped at a flow rate of 20 ml/minute and at a pressure of 30 psi. The co-extruded material forms droplets of gasified aromatized oil encapsulated in the aqueous gelatin which are dried in anhydrous alcohol having a water content of not more than 3% by weight. The dried particles are separated from the alcohol and gently heated at 20–50° C. to completely remove alcohol form the particles. The amount of open porosity in the shell is estimated to be about <25% based on the total shell porosity. The size of the particles is 1–3 mm. Density of the particles is 0.15–0.3 g/cc.

What is claimed is:
1. A method of making aromatized particles which comprises:
   providing gasified aromatized vegetable oil;
   providing an aqueous solution of a water soluble encapsulant containing 50 to 75% by weight dissolved solids based on the weight of the aqueous solution;

forcing the gasified aromatized vegetable oil through a first spray nozzle aperture and simultaneously forcing the aqueous solution through an annular spray nozzle aperture which surrounds said first spray nozzle to co-extrude droplets of gasified aromatized vegetable oil encapsulated by said aqueous solution; and contacting said droplets with a liquid desiccant to dehydrate said aqueous solution to form soluble aromatized particles having a solidified shell of a porous water soluble encapsulant encapsulating said aromatized vegetable oil, the porosity of said solidified shell being substantially closed cell porosity, open cell porosity of said shell being not more than 25% of the total porosity of said shell.

2. A method according to claim 1 wherein said vegetable oil is selected from the group consisting of coffee oil, safflower oil, palm oil, peanut oil, soy bean oil, and corn oil.

3. A method according to claim 1 wherein said aromatized vegetable oil comprises aromatized coffee oil which contains coffee aroma in an amount of from 0.01 to 20% by weight based on the weight of the aromatized coffee oil.

4. A method according to claim 3 wherein said aromatized coffee oil is present in an amount of from 20 to 80% by weight based on the weight of the particles.

5. A method according to claim 3 wherein said water soluble encapsulant is selected from the group consisting of instant coffee solids, instant tea solids, cyclodextrin, maltodextrin, gelatin, pectin, guar gum and gum arabic.

6. A method according to claim 5 wherein said water soluble encapsulant is instant coffee solids.

7. A method according to claim 6 wherein said aromatized coffee particles are substantially spherical and have a particle size of 0.5–5 mm.

8. A method according to claim 7 wherein said aromatized coffee particles have a density of from 0.1 to 0.8 g/cc.

9. A method according to claim 1 wherein the gasified aromatized vegetable oil is prepared by injecting an inert gas into aromatized vegetable oil in an amount sufficient to foam the vegetable oil.

10. A method according to claim 1 wherein the dessicant is dehydrated alcohol.

* * * * *